United States Patent [19]

Tidwell, Jr.

[11] 4,043,583
[45] Aug. 23, 1977

[54] LIGHTWEIGHT TRAILER CONSTRUCTION

[76] Inventor: Carl E. Tidwell, Jr., 5858 Riverview Road, Mableton, Ga. 30059

[21] Appl. No.: 675,075

[22] Filed: Apr. 8, 1976

[51] Int. Cl.² .......................................... B62D 33/00
[52] U.S. Cl. ............................................. 296/28 M
[58] Field of Search ............... 296/28 R, 28 M, 28 L, 296/28 D, 29; 280/106 R

[56] References Cited

U.S. PATENT DOCUMENTS

| | | | |
|---|---|---|---|
| 2,541,274 | 2/1951 | Nixon | 296/28 M |
| 2,752,013 | 6/1956 | Cole | 296/28 M |
| 3,282,603 | 11/1966 | Barth | 296/28 M |

Primary Examiner—Philip Goodman
Attorney, Agent, or Firm—Jones, Thomas & Askew

[57] ABSTRACT

A trailer including a vehicle body having walls formed by lengths of preformed members that are welded or otherwise fixed together to provide a unitary wall structure, the preformed member having a lower inwardly turned flange for receiving a bottom and an upper outwardly turned flange. A simplified frame is provided by members which extend laterally across the unitary wall structure.

12 Claims, 3 Drawing Figures

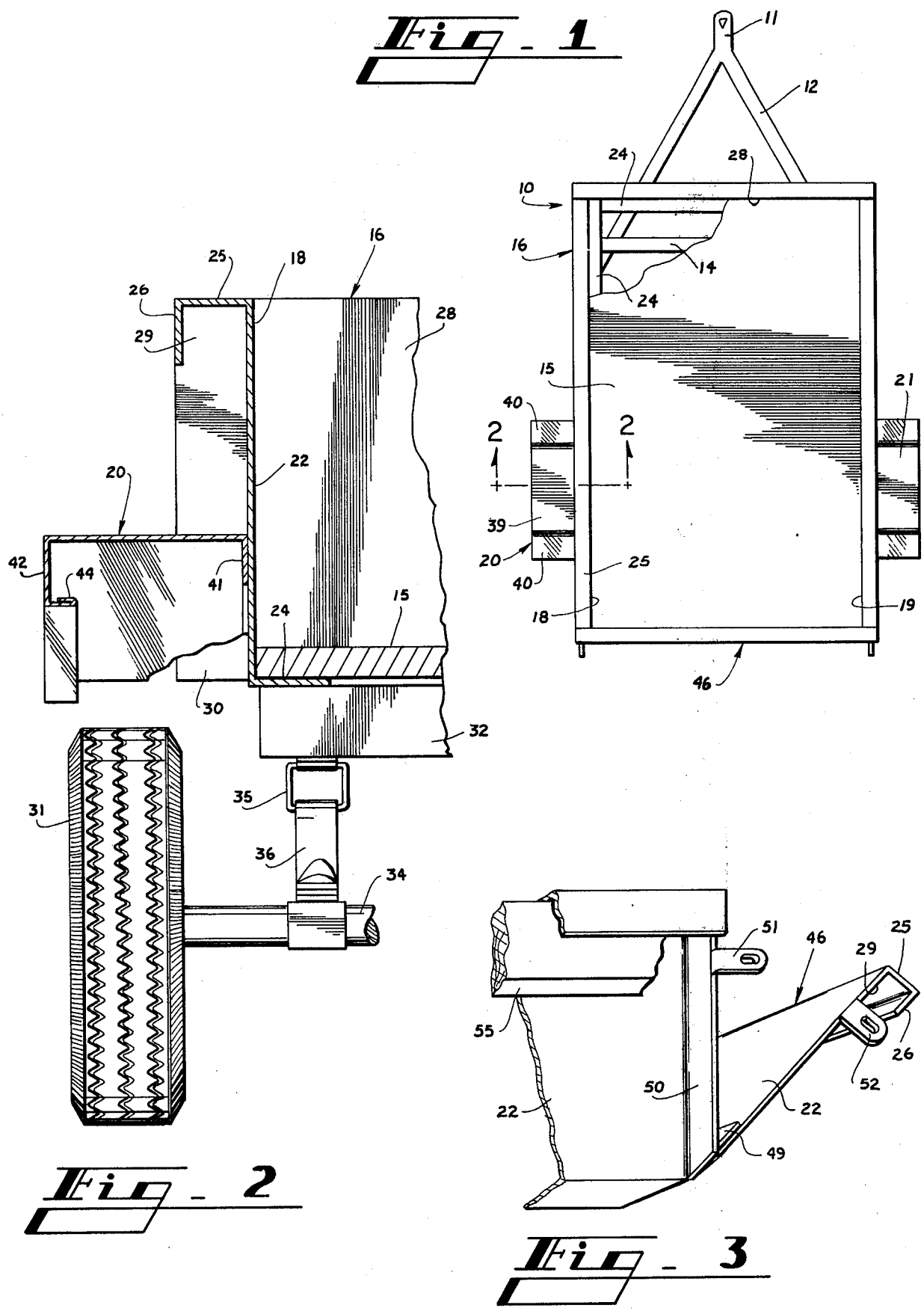

LIGHTWEIGHT TRAILER CONSTRUCTION

This invention relates to vehicle construction and the like, and is more particularly concerned with a lightweight trailer construction utilizing preformed members.

Trailer type vehicles have long been utilized, and have been constructed in a very large variety of shapes, forms and sizes. Trailers have normally been constructed either on a completely individual basis wherein each individual part of a trailer is separately made and separately installed to provide a virtually custom-made trailer, or the trailers have been mass produced utilizing large stampings wherein a bottom and two sides may be formed by one or several strokes of a die. While both forms of trailer construction have been used for a considerable number of years, and have met with commercial success, the custom-built variety of trailer tends to be relatively expensive due to the fact that each individual piece is individually cut and assembled; also, the custom-made trailer tends to be relatively heavy and relatively complex since structural members must be added to the basic sheet metal body to give the required strength. The mass produced trailer can use beads and the like formed in the metal at the time of the die stamping, but of course the dies are quite large and expensive, and require very large presses to handle these dies.

The present invention overcomes the above-mentioned and other difficulties with the prior art trailer construction by providing a lightweight trailer construction formed principally from a preformed structural member, the structural member being used for most if not all sides of the trailer. The sides and a bottom member are joined together to provide a unitary construction which, along with supporting cross-pieces and appropriate running gear, completes the vehicle. A trailer formed in accordance with the present invention is relatively easy to construct, lends itself to great variety in construction, and is both rigid and lightweight when the construction is completed. These and other features and advantages of the present invention will become apparent from consideration of the following specification when taken in conjunction with the accompanying drawings in which:

FIG. 1 is a top plan view of a trailer made in accordance with the present invention, a portion thereof being broken away to show the construction;

FIG. 2 is a cross-sectional view taken substantially along the line 2—2 in FIG. 1; and, FIG. 3 is a pictorial view showing one means of constructing a corner of a trailer made in accordance with the present invention.

Referring now more particularly to the drawings, and to that embodiment of the invention here chosen by way of illustration, it will be seen in FIG. 1 of the drawings that the trailer 10 includes a tongue 11 carried at the end of the A-frame hitch 12. The A-frame hitch 12 is fixed to the cross brace 14 by welding or the like, and the cross brace 14, and other cross braces to be discussed hereinafter, are covered by a trailer floor 15. The legs of the A-frame hitch 12 preferably extend beneath and are secured to the flanges 24 of the walls 18, 19, and 28, for added strength and rigidity. Surrounding the floor 15 is a wall generally designated at 16, and side walls 18 and 19 which made up a portion of the wall 16 have fenders 20 and 21 fixed thereto as will be discussed in more detail hereinafter.

Looking now at FIG. 2 of the drawings, it should first be seen that the side wall 18 comprises a preformed member of sheet metal or the like. While the present invention contemplates the use of preformed members that have been formed by rolling or the like, it is equally possible that the preformed members can be formed with the use of a sheet metal brake if desired. As will be better understood hereinafter, the preformed members are such that it would be relatively easy to form the member with a conventional, hand-operated brake, though of course production would be more efficient through the use of appropriate rolling apparatus.

Returning now to FIG. 2 of the drawings, it will be seen that the preformed member forming the side wall 18 includes a central web 22, and there is an inwardly turned flange 24 at the lower end of the central web 22. At the upper end of the central web 22, there is an outwardly turned flange 25 which terminates in a downwardly-turned flange 26 so that the upper edge of the side wall 18 has a finished appearance. In addition to the appearance, however, it will be seen that the lower, inwardly-turned flange 24 is turned to be generally perpendicular to the central web 22 so that, even with relatively lightweight sheet metal, the flange 24 will provide relatively great strength to prevent bending of the central web 22 in the longitudinal direction. Similarly, the flange 25 is disposed generally perpendicularly to the central web 22 so that the flange 25 also provides longitudinal strength for the central web 22. With the flanges 24 and 25, the central web 22 has a strengthening flange along each longitudinal edge so that the side wall 18 is a preformed member which has considerable strength. The downwardly-turned flange 26 is parallel to the central web 22 and is perpendicular to the flange 25 so that the outer edge of the flange 25 is greatly strengthened to withstand normal use of the trailer 10.

With the above description of the preformed member in mind, the trailer construction should now be understandable. Considering first the side walls 18 and 19 and the front wall 28, it will be understood that lengths of the preformed member are cut to form the appropriate lengths for the sides 18 and 19, and another length is cut for the front wall 28. The front wall 28 is of sufficient length to extend from the flange 26 on the side wall 18 to the flange 26 on the side wall 19 so that the front wall 28 closes the open end of the channel 29 that is formed by the upper edge of the preformed member.

While the lower edge of the front wall 28 provides the inwardly-turned flange 24 along the greater part of the front wall, it will be seen that the flange 24 is preferably removed from the preformed member that forms the front wall 28 at the locations where the flange 24 would extend outside of the side walls 18 and 19. This construction therefore provides a very neat appearance to the front corner by providing a clean lower edge 30, as shown in FIG. 2.

It will be understood that the side wall 19 is formed as a mirror image of the side wall 18, the entire construction being precisely the same.

Once the three walls 18, 19 and 28 are joined together, preferably by welding or the like along locations where two of the walls intersect, the unitary structure formed by the three sides is strengthened by securing a plurality of cross braces such as the cross brace 14 shown in FIG. 1 of the drawings and the cross brace 32 shown in FIG. 2 of the drawings, in position extending laterally across the flanges 24 of the side walls 18 and 19. It is from these cross braces that the axle carrying the wheels is suspended. As best shown in FIG. 2 of the drawings, the axle 34 may be suspended by fixing a pair of spring hangers, one of which is shown at 35, to corresponding ones of the laterally extending cross braces 32, the spring hangers being appropriately spaced apart for mounting a leaf type spring 36 which in turn carries the axle 34. While the spring hangers 35 can be located adjacent to the cross braces 32 both to provide the additional stability needed at the points of stress and to provide additional area if required for fixing the spring hangers 35, the spring hangers can alternatively be mounted directly to the underside of the respective flanges 24 of the preformed member comprising the side walls 18 and 19.

It will now be seen that the walls 18, 19 and 28 can be welded thereto so that there is a trailer having three sides and an inwardly-turned flange 24 from all three sides. This inwardly-turned flange 24 conveniently receives the bottom 15; because of the convenient means for receiving a bottom 15, the bottom can be formed of virtually any desired material which can be simply cut to size and shape and dropped into place on the flanges 24. The bottom is preferably made of sheet metal which is secured to the flanges 24 by welding or the like to provide a rigid unitized trailer structure, although the bottom may also be formed of plywood, particle board, or various other materials depending on the use to which the trailer is to be put.

As an alternative to the construction discussed above, the sides and ends of the present trailer can be fabricated from a single unitary length of preformed member that is provided with right-angle beads at three locations corresponding to the intersections of the two side walls, the front end, and the rear end. The resulting unitary four-wall construction provides the four-wall box indicated generally at 16, and is completed by welding together the confronting ends of the unitary preformed member to provide the fourth corner of the four-wall box. Suitable relief notches will, of course, have to be cut in the flanges 24 and 25 before bending the unitary preformed member. This unitary construction can also be used to fabricate the side walls and front wall of trailers having an openable tailgate.

At the end of the axle 34, there is a pair of wheels 38, the fenders 20 and 21 being mounted against the sides 18 and 19 above the wheels 38. It should be understood that, in addition to providing the usual service of containing splatter from the wheels 38, the fenders 20 and 21 may also provide additional strength to the sides 18 and 19. It will be seen that each of the fenders 20 and 21 includes a generally flat upper surface 39 and downwardly slanted front and rear surfaces 40. Since these fenders are placed generally on the central web 22 of the preformed members which make up the side walls 18 and 19, it will be seen that the central web 22 of each side wall is further strengthened. Each of the fenders 20 and 21 is further formed by having a downwardly-turned inner flange 41 that is fixed to the respective side walls 18 and 19 by welding or the like, and a parallel outer flange 42 turns downwardly and has an inwardly-turned hem 44 to complete the fender.

While the rear 46 of the trailer 10 can be completed in any desired manner, a tailgate 46' as illustrated in FIG. 3 of the drawings is desirable for many applications. It will be seen in FIG. 3 that the tailgate 46' comprises an additional length of the preformed member having the central web 22 and the channel 29 formed by the flanges 25 and 26. The inwardly-turned flange 24 would preferably be removed to allow space for hinges; however, the flange 24 may also be turned upwardly as shown in FIG. 3 at 49 to provide a strengthened lower edge of the tailgate to receive hinges.

To complete the rear edge of each side wall 18 and 19, there is a filler plate 50 that is generally the width of the channel 29 and extends down the full width of the central web 22, the plate 50 being welded or otherwise fixed into place. Extending rearwardly from the plate 50, there is a tab 51, having a mating tab 52 fixed to the tailgate 46'. This is a conventional arrangement well understood by those skilled in the art wherein, when the tailgate 46' is closed, the tabs 51 and 52 overlap to allow the tailgate 46' to be latched into place by a member such as a pin or the like.

Looking further at FIG. 3 of the drawings, it will be seen that, optionally, a channel filler 55 may be inserted into the channel 29 that extends along the side wall 18. As here indicated, it is contemplated that the filler member 55 would comprise a piece of wood that can be made to fit precisely within the width of the channel 29, and extend below the downwardly-turned flange 26. It would thus be seen that the filler member 55 provides additional strength to the entire wall; the filler member 55 also extends below the flange 26 and can be finished in natural wood grain, or can be painted or the like for an attractive effect. A similar channel filler can be supplied to the side wall 19.

From the foregoing, it should now be understood that the present invention provides a simple, lightweight trailer that can be easily formed by an individual, or by a small shop. There are simple variations and the construction can result in a wide variety of sizes, styles, and types of trailers from a very small utility trailer to a relatively large tandem axle trailer. For most trailers to be made in accordance with the present invention, the preformed member can be made of approximately sixteen gauge sheet steel, and of course extremely small and light duty trailers can be made of a preformed member of even a lighter gauge while larger, heavier duty trailers may be made of heavier gauge material.

It will of course be understood by those skilled in the art that the particular embodiment of the invention here shown is by way of illustration only, and is meant to be in no way restrictive; therefore, numerous changes and modifications may be made and the full use of equivalents resorted to without departing from the spirit or scope of the invention as defined in the appended claims.

I claim:

1. A trailer having a vehicle body including a plurality of walls, said plurality of walls comprising a first side wall, a second side wall parallel to said first side wall and formed as a mirror image of said first side wall, and a front wall, said front wall extending from said first side wall to said second side wall, each of said plurality of walls comprising a length of preformed member including a central web generally in the plane of the wall, a lower flange extending perpendicularly from the lower edge of said central web and inwardly of said vehicle body, and an upper flange on the upper edge of said central web, said central web being of a height substantially greater than the width of said upper flange and said lower flange, means for supporting said walls, and a bottom resting on said lower flange extending from each of said walls.

2. A trailer as claimed in claim 1, said upper flange extending outwardly of said vehicle body and defining a channel, said channel on said first side abutting said front wall, said channel on said second side abutting said front wall, and a filler plate fixed to the opposite end of said channel.

3. A trailer as claimed in claim 1, and including a tailgate, said tailgate comprising a length of said preformed member.

4. A trailer as claimed in claim 1, and further including a pair of fenders for covering wheels, each fender of said pair of fenders being fixed to one of said side walls and extending outwardly of said vehicle body.

5. A trailer as claimed in claim 1, wherein said bottom is rigidly secured to said lower flange extending from each of said walls so that said walls and said bottom member form a rigid unitary construction.

6. A trailer as claimed in claim 1, wherein said upper flange extends perpendicularly from the upper edge of said central web and outwardly of said vehicle body.

7. A trailer having a vehicle body including a plurality of walls, said plurality of walls comprising a first side wall, a second side wall parallel to said first side wall and formed as a mirror image of said first side wall, and a front wall, said front wall extending from said first side wall to said second side wall, each of said plurality of walls comprising a length of preformed member including a central web generally in the plane of the wall, a lower flange extending perpendicularly from the lower edge of said central web and inwardly of said vehicle body, and an upper flange on the upper edge of said central web, means for supporting said walls, and a bottom resting on said lower flange extending from each of said walls, said upper flange including an outwardly extending flange at said upper edge of said central web and perpendicular thereto, and a downwardly turned flange at the extending end of said outwardly extending flange, said downwardly turned flange being parallel to said central web.

8. A trailer as claimed in claim 7, said supporting means including a plurality of cross-braces fixed to said lower flange of each said longitudinal member.

9. A trailer as claimed in claim 7 and further including a channel filler within said channel, said channel filler extending below said downwardly turned flange.

10. A trailer having a vehicle body including a plurality of walls, said plurality of walls comprising a first side wall, a second side wall parallel to said first side wall and formed as a mirror image of said first side wall, and a front wall, said front wall extending from said first side wall to said second side wall, each of said plurality of walls comprising a length of preformed member including a central web generally in the plane of the wall, a lower flange extending perpendicularly from the lower edge of said central web and inwardly of said vehicle body, and an upper flange on the upper edge of said central web, said upper flange extending outwardly of said vehicle body and defining a channel, said channel on said first side abutting said front wall, said channel on said second side abutting said front wall, a filler plate fixed to the opposite end of said channel, a tailgate, said tailgate comprising a length of said preformed member, means for supporting said walls, and a bottom resting on said lower flange extending from each of said walls.

11. A trailer having a vehicle body including a plurality of walls, said plurality of walls comprising a first side wall, a second side wall parallel to said first side wall and formed as a mirror image of said first side wall, and a front wall, said front wall extending from said first side wall to said second side wall, each of said plurality of walls comprising a length of preformed member including a central web generally in the plane of the wall, a lower flange extending perpendicularly from the lower edge of said central web and inwardly of said vehicle body, and an upper flange on the upper edge of said central web, said upper flange extending outwardly of said vehicle body and defining a channel, said channel on said first side abutting said front wall, said channel on said second side abutting said front wall, a filler plate fixed to the opposite end of said channel, a pair of fenders for covering wheels, each fender of said pair of fenders being fixed to one of said side walls and extending outwardly of said vehicle body, means for supporting said walls, and a bottom resting on said lower flange extending from each of said walls.

12. A trailer as claimed in claim 11, said channel including an outwardly extending flange at said upper edge of said central web and perpendicular thereto, and a downwardly turned flange at the extending end of said outwardly extending flange, said downwardly turned flange being parallel to said central web.

* * * * *